United States Patent
Hoffman

[15] 3,662,970
[45] May 16, 1972

[54] TAPE CONTROL MECHANISM

[72] Inventor: Paul R. Hoffman, Farmington, Mich.
[73] Assignee: Burroughs Corporation, Detroit, Mich.

[22] Filed: Aug. 21, 1970
[21] Appl. No.: 65,925

[52] U.S. Cl. ....................242/180, 242/201
[51] Int. Cl. ....................G03b 1/04, G11b 15/32
[58] Field of Search ....................242/180, 192, 201–204

[56] References Cited

UNITED STATES PATENTS 2,979,277 4/1961 Page et al. ....................242/201
2,091,525 8/1937 Runge....................242/192 X

*Primary Examiner*—Leonard D. Christian
*Attorney*—Kenneth L. Miller and Edwin W. Uren

[57] ABSTRACT

Apparatus for use in tape handling equipment comprising a plurality of laterally positioned tape reels arranged with their rim peripheries normally spaced from a pair of oppositely rotating driven shafts, the shafts spanning all of the reels axially thereof. Each of the reels is individually cradled on its rim by a set of three spaced apart roller bearings, and at least one of the rollers of each set is shiftable to effect rotation of selected ones of the reels by one or the other of the oppositely rotating shafts.

13 Claims, 3 Drawing Figures

Patented May 16, 1972 3,662,970

INVENTOR.
PAUL R. HOFFMAN
BY
Edwin W. Uren
AGENT

TAPE CONTROL MECHANISM

FIELD OF THE INVENTION

The invention relates generally to tape reel driving mechanism and particularly to tape reel mountings.

Known tape feeding mechanisms usually include a pair of reels keyed respectively onto separate parallel shafts, and provide drive means for driving one or the other of the shafts to effect tape winding onto either of the reels. Where it is desired, in the interests of efficiency, to employ a plurality of laterally positioned pairs of reels operating simultaneously, certain problems are encountered. For example, known reel mountings are such that a number of sets of reels cannot be driven at random intervals from a common shaft especially if it is required that certain pairs of the reels perform tape winding in one direction while other pairs of reels perform tape winding in the opposite direction. Another disadvantage to mounting reels onto a common shaft in conventional fashion would be the difficulty in removing and replacing the reels.

SUMMARY OF THE INVENTION

The invention resides in the provision of a number of sets of spaced-apart roller bearings, each set serving to define a cradle to receive the rim of a tape reel, the roller bearings serving also to normally hold the reels in spaced relation relative to a pair of continuously and oppositely rotating shafts. At least one of the cradle defining bearings of each set is shiftable to effect a driving connection between one of the continuously rotating shafts and the rim of its associated cradled reel. A pair of electrically operated actuators are provided for each reel, such actuation being responsive to a decrease or increase in the winding or unwinding speed of the tape as the tape is driven past a read or write head, to thereby shift the shiftable bearing in such manner as to maintain such winding and unwinding speed substantially constant and compatible with the speed at which the tape is driven past the read or write head.

An important object of the invention is to provide a roller bearing cradle for rim mounting a tape reel in tape handling equipment, such rim mounting permitting reel insertion and removal without removal of parts of either a supporting or driving character.

Another object of the invention is to provide a rim mounting roller bearing cradle with shiftable means whereby the rim of the tape reel may be moved into indirect driven engagement with one or the other of a pair of constantly rotating shafts, such engagement effectively controlling the winding or unwinding speed of the tape on the reel.

A further object of the invention is to provide a plurality of laterally positioned reel supporting cradles such that a plurality of reels may be selectively and controllably driven from one or the other of the oppositely rotating shafts.

DETAILED DESCRIPTION OF THE INVENTION

Figures 1, 2, 3:
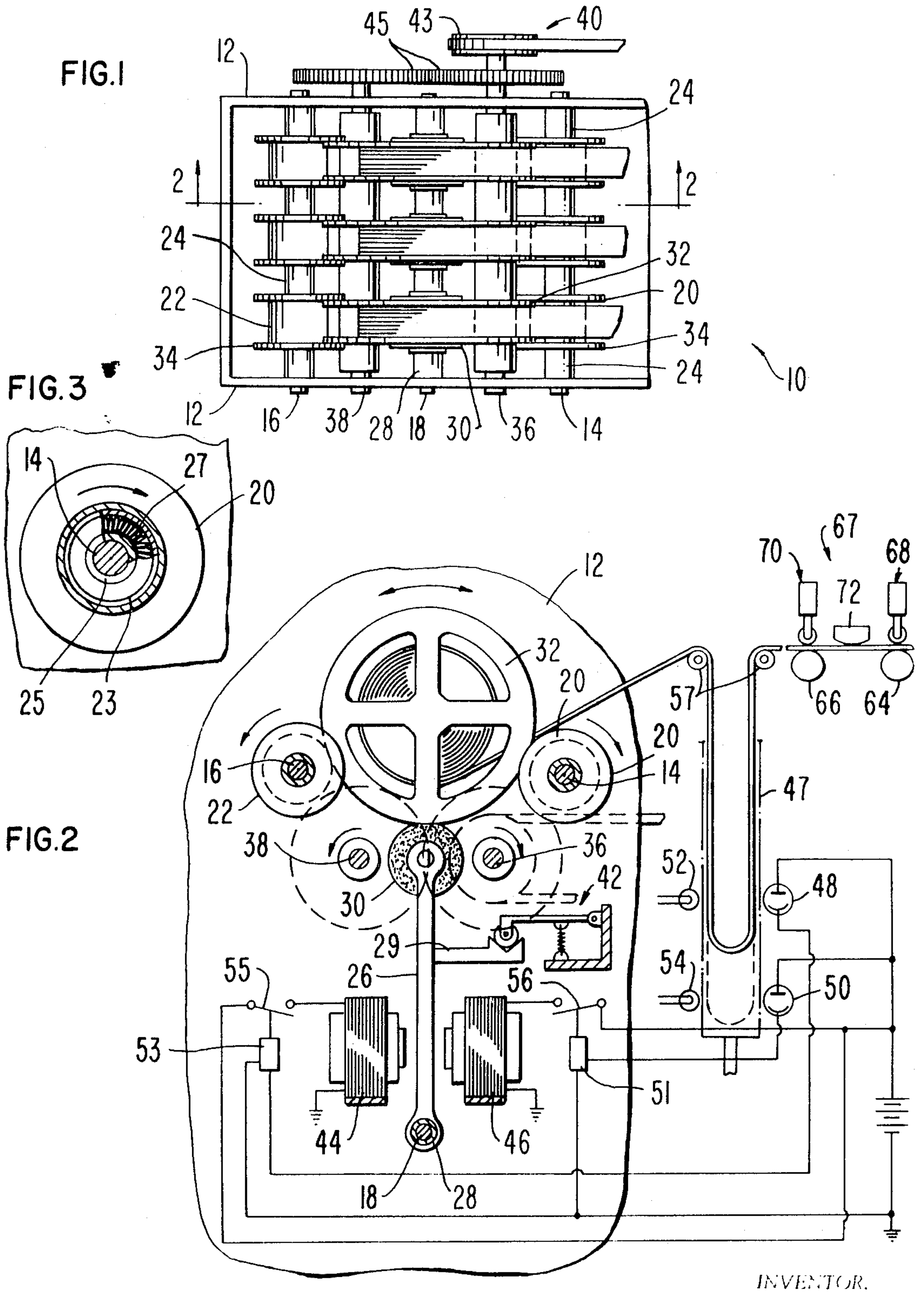
FIG. 1 is a fragmentary plan view of cradling apparatus for supporting tape reels.
FIG. 2 is a vertical sectional view of the preferred embodiment of the invention, partly in elevation, and taken along the line 2—2 of FIG. 1, with control means also illustrated.
FIG. 3 is a detailed view of one of the roller bearings of the preferred embodiment as generally illustrated in FIG. 2.

With reference to the drawings and in particular to FIGS. 1 and 2, there is shown a housing 10 having opposite side walls 12 supporting a plurality of fixed parallel shafts 14, 16 and 18. Rotatably disposed on the shafts 14 and 16 are a plurality of associated roller bearings 20 and 22 which are maintained in equal spaced-apart relationship by tubular spacers 24. Each of the roller bearings 20 and 22 is so constructed as to permit full rotational movement in one direction only, such construction, as illustrated in FIG. 3, providing an inner sleeve 25 fixed to the shaft 14 or 16, an outer rotatable sleeve 23, and a plurality of flexible members 27 housed between the sleeves 23 and 25. The flexible members 27 are so disposed and canted as to allow rotation of the rollers 20, 22 only in the direction indicated by the arrows in FIG. 2, rotation in the opposite direction being prevented by the limiting bite of the radial extremities of the flexible members 27 against the inner and outer sleeves 25 and 23, respectively. Pivotally mounted on the shaft 18 are a plurality of pivotal arms or levers 26 which are individually rotatable and equally spaced-apart by tubular spacers 28. Each of the arms 26 is provided with a roller bearing 30 journaled at the upper end thereof, such roller bearing being laterally positioned of its arm 26 and normally disposed below and in centered vertical alignment with the axis of its corresponding reel 32, as shown in FIG. 2.

The reels 32, when in their installed and cradled state, are accordingly disposed with their rim peripheries engaging the roller bearing 30 and one of the roller bearings 20 or 22, as shown in FIG. 2. The roller bearings 20 and 22, also include side retaining flanges 34 to receive the reel flanges therebetween. Preferably, the roller bearings 20 and 22 are coated with a material having a relatively high coefficient of friction such as rubber or rubberized material.

The preferred embodiment of the invention provides a pair of driven shafts 36 and 38 which are positioned in parallel relationship with respect to the axis of the reels 32, and spaced from the rims of the reels 32 as viewed in FIG. 2, the shafts 36 and 38 spanning the reels as shown in FIG. 1. The shaft 36 is horizontally positioned on one side of the roller bearings 30, and located in an interposed relationship relative to the bearings 20 and 30. The shaft 38 is horizontally positioned on the opposite side of the roller bearings 30, and located in interposed relationship relative to the roller bearings 22 and 30. The shafts 36 and 38 are continuously driven in the direction shown in FIG. 2 by an electric motor (not shown) and a belt driven gear train 40 comprised of a pulley 43 and two gear wheels 45 fixed to the shafts 36 and 38, respectively, as shown in FIG. 1. The roller bearings 30 are preferably coated with a suitable rubber or rubberized substance in like manner to the roller bearings 20 and 22, to maximize their frictional driving effect relative to the shafts 36 and 38, and to the reels 32.

Each of the arms 26 is provided with an extension 29 having a V-shaped extremity, the V-shaped extremity cooperating with a spring biased detent 42 to yieldably retain the arm 26 and roller bearing 30 centrally spaced from the driven shafts 36 and 38 and in supporting relationship relative to its cradled reel 32. Means hereinafter described in greater detail are provided for selectively moving the arms 26 in either a clockwise or counterclockwise direction on the shaft 18, such means including corresponding solenoids 44 and 46 which are selectively activated in response to the changing length of a loop of tape in a vacuum column 47 (shown in phantom lines).

When an arm 26 associated with a given cradled tape reel 32 is pivoted in a counterclockwise direction by its corresponding solenoid 44, its roller bearing 30 is moved into driven contact with the counterclockwise rotating shaft 38, to thereby cause the reel 32 to be rotated in a counterclockwise unwinding direction, the roller bearing 30 serving as an intermediary driven member rotating in a clockwise direction. When, on the other hand, the arm 26 is rotated in a clockwise direction by its corresponding solenoid 46, its roller bearing 30 is moved into contact with the clockwise rotating shaft 36 to thereby cause the reel 32 to be rotated in a clockwise winding direction, the intermediary roller 30 rotating in a counterclockwise direction.

Control means for activating the solenoids 44 and 46 associated with each reel 32 in the above described embodiment are provided, such means including a pair of photoelectric cells 48 and 50 spaced from a corresponding pair of light sources 52 and 54. As shown in FIG. 2, each of the photoelectric cells 48 and 50 is fixed in predetermined relationship with a vacuum chamber 47 (shown in phantom lines), and in spaced relation relative to the light sources 52 and 54, the loop of the tape being normally positioned by a pair of guide rollers 57 within the vacuum chamber 47 and between the photoelectric cells 48, 50 and the light sources 52, 54. The light sources 52 and 54 and the photoelectric cells 48 and 50 are electrically connected to the solenoids 44 and 46 in such manner as to energize the solenoid 44 when the loop length of the tape in the chamber 47 is shortened sufficiently to permit the passage of light from the light source 52 to the photoelectric cell 48, and to energize the solenoid 46 when the loop length of the tape is lengthened sufficiently to interrupt the passage of light from the light source 54 to the photoelectric cell 50. Included in the electrical circuit for energizing the solenoid 44 are solenoid actuator 53 and switch 55, which are the counterparts for an actuator 51, and a switch 56 included in the circuit for energizing the solenoid 46.

Energization of the solenoid 44 is effective to pivot or rotate the arm 26 in a counterclockwise direction, which, as previously indicated, results in the counterclockwise or unwinding rotation of the associated reel 32, and energization of the solenoid 46 is effective to pivot the arm 26 in a clockwise direction to thereby effectuate a clockwise or winding rotation of the reel 32.

The present invention may be used to advantage for example in a tape handling system such as that disclosed in U. S. Pat. No. 2,952,415 which teaches apparatus for controllably transporting tape as between a pair of reels and past a read or write station, such patent, assigned to the assignee of the present invention, disclosing in greater detail the various characteristics and requirements of typical tape transport equipment. It is to be noted that the present invention as illustrated in FIG. 2 would be required in duplicate in such a tape transport system.

OPERATION OF THE APPARATUS

When used in tape transport equipment such as is disclosed in the above-referenced patent, the mechanism of FIG. 2 would be duplicated in common plane therewith and in reverse order thereto, such duplicated mechanism being disposed to the right of the driven roller 64 shown in FIG. 2 to comprise a tape transport system. When it is desired to transport tape from the left reel 32 past a read-write station 67 and onto the right reel of such a tape transport system, a pinch roller solenoid 68 would be energized to thereby activate a drive roller 64, the tape being accordingly driven to the right past a read-write head at substantially constant speed. Rightward movement of the tape would cause the loop length of the tape in the left chamber 47 to shorten, until such time as the passage of light from the light source 52 to the photoelectric cell 48 is permitted, whereupon the solenoid 44 is energized by means of the actuator 53 and the switch 55. The arm 26 is accordingly pivoted counterclockwise to effectuate the counterclockwise or unwinding rotation of the left reel 32, the effect thereof being the lengthening of the loop of the tape within the left chamber 47. The loop will continue to lengthen until such time as the passage of light between the light source 52 and the cell 48 is again interrupted, whereupon the solenoid 44 is deenergized, and the arm 26 is restored to its central inoperative position by the urging of the spring biased detent 42 against an inclined slope of the V-shaped member 29. In the event the counterclockwise unwinding rotation of the left reel 32 results in lengthening the loop within the left chamber 47 to such extend as to interrupt the passage of light from the light source 54 to the photoelectric cell 50, the solenoid 46 would be energized by means of the actuator 51 and the switch 56 to thereby pivot the arm 26 in a clockwise direction and to effectuate the clockwise or winding rotation of the left reel 32. Such winding of the left reel 32 would serve to shorten the length of the loop in the chamber 47 until such time as the passage of light between the light source 54 and the cell 50 is again permitted, whereupon the solenoid 46 would be deenergized and the arm 26 returned to its central position through the urging of the spring biased detent 42. Through the continued actuation of the solenoids 44 and 46 as the length of the loop within the chamber 47 alternately lengthens and shortens, unwinding of the tape from the left reel is maintained within predetermined parameters and at a speed substantially consistent with the rightward feeding of the tape past the read-write head 72 by the activated drive roller 64.

When it is desired to transport tape from the right reel 32 past the read-write head 72 and onto the left reel 32, a pinch roller solenoid 70 would be energized to thereby activate a drive roller 66. Leftward movement of the tape would cause the loop length of the tape in the left chamber 47 to lengthen, until such time as the passage of light from the light source 54 to the photoelectric cell 50 is interrupted, thereby energizing the solenoid 46 to pivot the arm 26 in a clockwise direction and to effectuate the clockwise or winding rotation of the left reel 32. Such winding of the left reel 32 would serve to shorten the length of the loop in the left chamber 47 until the passage of light between the light source 54 and the cell 50 is again permitted, whereupon the solenoid 46 would be deenergized and the arm 26 returned to its central position by means of the detent 42. Should the length of the loop within the left chamber 47 be sufficiently shortened by the winding of the tape onto the left reel 32 that the passage of light between the light source 52 and the cell 48 is permitted, the solenoid 44 would be energized to pivot the arm 26 counterclockwise and to effectuate a momentary unwinding of the tape from the left reel 32, such unwinding terminating when the length of the loop again interrupts such passage of light.

As previously indicated, the roller bearings 20 and 22 are permitted rotation in a single direction only, as illustrated by the arrows in FIG. 2. It is accordingly to be noted that each of the reels 32 is subjected to a braking action provided by the bearings 20 and 22, such braking action resulting from the shifting or pivoting of the bearing 30 between shafts 36 and 38. This braking action of the reel 32 serves to maintain the tape in a desired position within the vacuum column and prevents the tape from running ahead in either a winding or unwinding direction at the instant of release of the bearing 30 from either shaft 36 or 38. In explanation of this braking effect, reel winding and unwinding is hereinafter detailed at greater length.

As suggested by FIG. 2, the initial or rest position of the reel 32 is defined by the bearing 30 and by either the bearing 22 or 20. When the arm 26 is pivoted from its central or rest position in a counterclockwise direction it will cause the bearing 30 to contact the driven shaft 38 to initiate unwinding of the reel 32. The reel 32 shifts under the influence of gravity to be cradled between the bearing 30 and the bearing 20 which allows unwinding rotation of the reel 32 and a corresponding clockwise rotation of the bearing 20. Upon lengthening of the loop of tape the desired amount, the bearing 30 is returned to its rest position and the reel 32 is shifted to a rest position defined by the bearings 30 and 22. An overthrow unwinding rotation of reel 32 is accordingly prevented by the bearing 22, which is permitted counterclockwise rotation only.

When the bearing 30 is pivoted into contact with the driven shaft 36 to initiate a clockwise winding rotation of the reel 32, the reel 32 is shifted under the influence of gravity to be cradled between the bearing 30 and the bearing 22 which allows a winding rotation of the reel 32 and a corresponding counterclockwise rotation of the bearing 22. Upon the return of the bearing 30 to its rest position, the reel 32 is shifted to a rest position defined by the bearings 30 and 20. An overthrow winding rotation of the reel 32 is accordingly prevented by the bearing 20, which is permitted clockwise rotation only. Accordingly, the angular momentum of the reel 32 and the pivotal action of the bearing 30 between the driven shafts 36 and 38 serve to drive the reel 32 in a winding or unwinding direction, and to exert a braking effect upon the reel to prevent overthrow winding and unwinding.

While an embodiment of the invention has been shown and described in considerable detail, it will be apparent that other adaptations and modifications can be made by one skilled in the art without departing from the true spirit and scope of the invention.

What is claimed is:

1. In tape transport equipment for the feedable movement of tape as between a plurality of pairs of tape reels and in either direction past associated read or write stations, tape reel cradling and rim drive apparatus comprising:

duplicate cradling means effective for statically and rotatably supporting said plurality of pairs of tape reels, each of said duplicate cradling means serving to cradle the rim peripheries of corresponding ones of said plurality of pairs, a pair of driven shafts associated with each of said duplicate cradling means, means for driving said driven shafts such that each of said pair of shafts is continuously and oppositely rotated, and control means operatively associated with each tape reel of said plurality of pairs of tape reels and with one of said pairs of oppositely rotating shafts, said control means being effective to maintain the tape winding and unwinding speed of its associated reel substantially constant and consistent with the speed at which its associated tape is moved past its associated read or write station.

2. The tape reel cradling and rim drive apparatus according to claim 1 wherein the cradling means for each tape reel is comprised of a plurality of bearing members positioned to form a cradle, two of said bearing members being spaced-apart and a third of said bearing members being positioned below said reel and intermediate said spaced-apart bearing members.

3. The tape reel cradling and rim drive apparatus according to claim 2 wherein each of said spaced-apart bearing members includes a one-way clutch permitting rotation of its associated bearing in one direction only, such permitted rotation of said spaced-apart bearing members being of an oppositely directed nature.

4. The tape reel cradling and rim drive apparatus according to claim 2 wherein said third bearing member is shiftable from an intermediate position to effect rotation of its associated reel by means of one of said associated pair of driven shafts.

5. The tape reel cradling and rim drive apparatus according to claim 4 wherein said shiftable bearing member is provided with a detent member operatively biased to return said shiftable bearing member to its said intermediate position relative to its associated spaced-apart bearing members.

6. The tape reel cradling and rim drive apparatus according to claim 4 wherein each of said control means is comprised of a pair of oppositely disposed electro-magnets, said magnets being effective to shift its associated third or shiftable bearing member such that its associated reel is driven by one or the other of said pair of associated driven shafts.

7. The tape reel cradling and rim drive apparatus according to claim 6 wherein said shifting of said shiftable bearing member by said oppositely disposed electro-magnets is effective to drive the reels associated therewith through the contact of said shifted bearing members with said driven shafts.

8. A tape transport mechanism for feeding tape comprising:

a tape reel, a plurality of spaced-apart bearing members engaging the rim of said reel to floatingly support the reel while permitting rotation thereof about its axis, at least one drive shaft positioned below said reel and between the outermost ones of said plurality of bearing members, means for mounting one of said bearing members for shiftable movement so as to effect a driving connection between the shaft and the reel for rotating the reel about its axis, and control means responsive to the condition of the tape fed with respect to the reel for moving said shiftable member.

9. The invention defined in claim 8 characterized in that the shiftable bearing member is movable into engagement with one of said drive shafts while maintaining engagement with the reel to provide a driving connection therebetween.

10. The invention defined in claim 9 characterized in that detent means is provided for normally holding the shiftably movable bearing member out of engagement with the drive shaft.

11. The invention defined in claim 9 characterized in that there are a pair of oppositely rotatable drive shafts to effect clockwise and counterclockwise rotation of the reel.

12. The invention defined in claim 11 characterized in that electrical operating means is provided for shifting said shiftable bearing member toward and into engagement with one or the other of said pair of drive shafts; and in the provision of control means responsive to the length of the loop of tape which is being either wound or unwound by the reel for controlling the direction of movement of the shiftable means toward one or the other of said pair of drive shafts.

13. The invention defined in claim 9 characterized in that a pair of said plurality of bearing members are restrained from rotation in directions counter to one another so that when the reel is in engagement with one or the other of said pair of bearing members it has a permitted rotation in only one direction which direction of rotation is opposite to that permitted by the other.

* * * * *